United States Patent
Higashino et al.

(10) Patent No.: US 11,545,690 B2
(45) Date of Patent: Jan. 3, 2023

(54) PROTON CONDUCTOR, PROTON-CONDUCTING CELL STRUCTURE, WATER VAPOR ELECTROLYSIS CELL, AND METHOD FOR PRODUCING HYDROGEN ELECTRODE-SOLID ELECTROLYTE LAYER COMPLEX

(71) Applicants: Kyoto University, Kyoto (JP); SUMITOMO ELECTRIC INDUSTRIES, LTD., Osaka (JP)

(72) Inventors: Takahiro Higashino, Osaka (JP); Yohei Noda, Osaka (JP); Chihiro Hiraiwa, Osaka (JP); Naho Mizuhara, Osaka (JP); Mitsuyasu Ogawa, Osaka (JP); Hiromasa Tawarayama, Osaka (JP); Masatoshi Majima, Osaka (JP); Tetsuya Uda, Kyoto (JP); Donglin Han, Kyoto (JP); Takayuki Onishi, Kyoto (JP)

(73) Assignees: KYOTO UNIVERSITY, Kyoto (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 274 days.

(21) Appl. No.: 16/767,747

(22) PCT Filed: Nov. 16, 2018

(86) PCT No.: PCT/JP2018/042539
§ 371 (c)(1),
(2) Date: May 28, 2020

(87) PCT Pub. No.: WO2019/107194
PCT Pub. Date: Jun. 6, 2019

(65) Prior Publication Data
US 2021/0005916 A1    Jan. 7, 2021

(30) Foreign Application Priority Data

Nov. 29, 2017 (JP) .............................. JP2017-229685
Feb. 22, 2018 (JP) .............................. JP2018-030074

(51) Int. Cl.
*H01M 4/02* (2006.01)
*H01M 8/1246* (2016.01)
(Continued)

(52) U.S. Cl.
CPC ............. *H01M 8/1246* (2013.01); *C25B 1/04* (2013.01); *H01B 1/08* (2013.01); *H01B 1/122* (2013.01); *H01M 4/88* (2013.01)

(58) Field of Classification Search
CPC ...................................................... H01M 4/02
See application file for complete search history.

(56) References Cited

U.S. PATENT DOCUMENTS

2007/0278092 A1* 12/2007 Irvine ................... C25B 13/04
204/194
2012/0021330 A1  1/2012 Kobayashi et al.
(Continued)

FOREIGN PATENT DOCUMENTS

EP    2908371 A1    8/2015
EP    3023995 A1    5/2016
(Continued)

OTHER PUBLICATIONS

Office Action dated Nov. 10, 2020 that issued in U.S. Appl. No. 16/061,888.
(Continued)

*Primary Examiner* — Jacob B Marks
(74) *Attorney, Agent, or Firm* — Faegre Drinker Biddle & Reath LLP (57) ABSTRACT

A proton conductor contains a metal oxide that has a perovskite structure and that is represented by formula (1):
(Continued)

$A_xB_{1-y}M_yO_{3-\delta}$, where an element A is at least one element selected from the group consisting of Ba, Ca, and Sr, an element B is at least one element selected from the group consisting of Ce and Zr, an element M is at least one element selected from the group consisting of Y, Yb, Er, Ho, Tm, Gd, In, and Sc, $\delta$ indicates an oxygen deficiency amount, and $0.95 \leq x \leq 1$ and $0 < y \leq 0.5$ are satisfied.

6 Claims, 6 Drawing Sheets

(51) Int. Cl.
  C25B 1/04      (2021.01)
  H01B 1/08      (2006.01)
  H01B 1/12      (2006.01)
  H01M 4/88      (2006.01)

(56) References Cited

U.S. PATENT DOCUMENTS

| | | |
|---|---|---|
| 2015/0044597 A1 | 2/2015 | Hiraiwa et al. |
| 2015/0221407 A1 | 8/2015 | Zenitani et al. |
| 2015/0263355 A1 | 9/2015 | Hiraiwa et al. |
| 2016/0204446 A1 | 7/2016 | Higashino et al. |
| 2017/0076832 A1 | 3/2017 | Zenitani et al. |
| 2018/0037508 A1 | 2/2018 | Higashino et al. |
| 2018/0375114 A1 | 12/2018 | Higashino et al. |
| 2019/0006692 A1 | 1/2019 | Higashino et al. |

FOREIGN PATENT DOCUMENTS

| | | |
|---|---|---|
| JP | H01-298020 A | 12/1989 |
| JP | H06-196181 A | 7/1994 |
| JP | 2001-307546 A | 11/2001 |
| JP | 2007-197315 A | 8/2007 |
| JP | 2010-080304 A | 4/2010 |
| JP | 2011-150932 A | 8/2011 |
| JP | 2012-43774 A | 3/2012 |
| JP | 2012-138256 A | 7/2012 |
| JP | 2014-013694 A | 1/2014 |
| JP | 2014-060028 A | 4/2014 |
| JP | 2014-072115 A | 4/2014 |
| JP | 2015-046251 A | 3/2015 |
| JP | 2015-147997 A | 8/2015 |
| JP | 2016-071930 A | 5/2016 |
| JP | 2017-041308 A | 2/2017 |
| WO | WO-2014/057877 A1 | 4/2014 |
| WO | WO-2015/008407 A1 | 1/2015 |
| WO | WO-2015/029713 A1 | 3/2015 |
| WO | WO-2015/114684 A1 | 8/2015 |
| WO | WO-2016/157566 A1 | 10/2016 |
| WO | WO-2017/104806 A1 | 6/2017 |

OTHER PUBLICATIONS

Babilo, Peter et al. "Processing of Yttrium Doped Barium Zipconate for High Proton Conductiviry," J. Mater, Res., vol. 22, No. 5, May 2007, pp. 1322-1330 (XP002682264).

Bohn, Hans G. et al. "Electrical Conductivity of the High-Temperature Proton Conductor $BaZr_{o.9}Y_{o.1}O_{2.95}$," J. Am. Ceram Soc., 83 [4] 768-72 (2000).

Fang, Shumin et al., "Relationship between fabrication method and chemical stability of Ni—BaZr0.8Y0.2O3-δ membrane," Journal of Power Sources, 278 (2015) pp. 614-622.

Iguchi, Fumitada et al., "The influence of grain structures on the electrical conductivity of a $BaZr_{o.95}Y_{o.05}O_3$ proton conductor," Solid State Ionics 177 (2006) 2381-2384.

Katahira, Koji et al., "Protonic conduction in Zr-substituted $BaCeO_3$," Solid State Ionics 138 (2000) 91-98.

International Search Report dated Feb. 28, 2017 for PCT/JP2016/087563.

Election/Restriction Requirement issued for U.S. Appl. No. 16/061,888 dated Mar. 23, 2020.

First OA issued for U.S. Appl. No. 16/061,888 dated May 13, 2020.

Ka-Young Park et al., "Enhanced proton conductivity of yttrium-doped barium zirconate with sinterability in protonic ceramic fuel cells" Journal of Alloys and Compounds, vol. 639, 2015, pp. 435-444.

\* cited by examiner

PROTON CONDUCTOR, PROTON-CONDUCTING CELL STRUCTURE, WATER VAPOR ELECTROLYSIS CELL, AND METHOD FOR PRODUCING HYDROGEN ELECTRODE-SOLID ELECTROLYTE LAYER COMPLEX

TECHNICAL FIELD

The present disclosure relates to a proton conductor, a proton-conducting cell structure, a water vapor electrolysis cell, and a method for producing a hydrogen electrode-solid electrolyte layer complex.

This application claims priority on Japanese Patent Application No. 2017-229685 filed on Nov. 29, 2017, and Japanese Patent Application No. 2018-030074 filed on Feb. 22, 2018, the entire contents of which are incorporated herein by reference.

BACKGROUND ART

A proton conductive metal oxide having a perovskite structure has been known as a solid electrolyte that can be applied to PCFCs (Protonic Ceramic Fuel Cells, proton conductive oxide type fuel cells) using hydrogen ions (protons) as charge carriers (PATENT LITERATURE 1 and PATENT LITERATURE 2).

CITATION LIST

Patent Literature

PATENT LITERATURE 1: Japanese Laid-Open Patent Publication No. 2001-307546
PATENT LITERATURE 2: Japanese Laid-Open Patent Publication No. 2007-197315

SUMMARY OF INVENTION

A proton conductor of the present disclosure contains a metal oxide that has a perovskite structure and that is represented by the following formula (1):

$$A_xB_{1-y}M_yO_{3-\delta} \qquad (1),$$

where
an element A is at least one element selected from the group consisting of Ba, Ca, and Sr,
an element B is at least one element selected from the group consisting of Ce and Zr,
an element M is at least one element selected from the group consisting of Y, Yb, Er, Ho, Tm, Gd, In, and Sc,
δ indicates an oxygen deficiency amount, and
$0.95 \leq x \leq 1$ and $0 < y \leq 0.5$ are satisfied.

A proton-conducting cell structure of the present disclosure includes an oxygen electrode, a hydrogen electrode, and the proton conductor of the present disclosure interposed between the oxygen electrode and the hydrogen electrode.

A water vapor electrolysis cell of the present disclosure includes the proton-conducting cell structure of the present disclosure.

A method for producing a hydrogen electrode-solid electrolyte layer complex of the present disclosure includes:
a first step of obtaining a cell precursor in which a porous first solid electrolyte layer and a dense second solid electrolyte layer are integrated with each other; and
a second step of providing a nickel component in pores of the first solid electrolyte layer, wherein each of the first solid electrolyte layer and the second solid electrolyte layer contains a metal oxide that has a perovskite structure and that is represented by the following formula (1):

$$A_xB_{1-y}M_yO_{3-\delta} \qquad (1),$$

where
an element A is at least one element selected from the group consisting of Ba, Ca, and Sr,
an element B is at least one element selected from the group consisting of Ce and Zr,
an element M is at least one element selected from the group consisting of Y, Yb, Er, Ho, Tm, Gd, In, and Sc,
δ indicates an oxygen deficiency amount, and
$0.95 \leq x \leq 1$ and $0 < y \leq 0.5$ are satisfied.

DESCRIPTION OF EMBODIMENTS

Technical Problem

For a cell structure in which yttria-stabilized zirconia (YSZ) is used for a solid electrolyte layer, a configuration in which a hydrogen electrode obtained by mixing NiO and a solid electrolyte is used as a support for a thinned solid electrolyte layer has been studied. Even with a proton conductive metal oxide, it is possible to make the solid electrolyte layer thinner by the above configuration.

However, the cell structure is formed by co-sintering a hydrogen electrode and a solid electrolyte layer. During co-sintering, when Ni of the hydrogen electrode diffuses into the proton conductive metal oxide, the proton conductivity of the metal oxide decreases. Ni that has diffused into the proton conductive metal oxide also decreases the transport number of ionic conduction, and thus the leakage current can increase. Therefore, when the cell structure is used in a water vapor electrolysis cell, the electrolysis efficiency is likely to decrease.

When the proton conductive metal oxide is barium zirconate doped with yttrium, sintering is usually performed at a temperature of 1600° C. or higher in consideration of low sinterability. At that time, Ba becomes deficient due to evaporation, which may cause a decrease in transport number of ionic conduction and proton conductivity.

Advantageous Effects of Invention

When the proton conductor according to the present disclosure is applied to a water vapor electrolysis cell and/or a fuel cell, a high transport number of ionic conduction is obtained, and thus the current efficiency is improved. Moreover, with the method for producing a hydrogen electrode-solid electrolyte layer complex according to the present disclosure, a proton-conducting cell structure having excellent current efficiency can be formed.

DESCRIPTION OF EMBODIMENTS OF INVENTION

First, contents of embodiments of the present disclosure will be listed and described.

(1) An embodiment of the present disclosure relates to a proton conductor containing a metal oxide that has a perovskite structure and that is represented by formula (1): $A_xB_{1-y}M_yO_{3-\delta}$. Here, an element A is at least one element selected from the group consisting of Ba, Ca, and Sr, an element B is at least one element selected from the group consisting of Ce and Zr, and an element M is at least one element selected from the group consisting of Y, Yb, Er, Ho, Tm, Gd, In, and Sc. The formula (1) satisfies $0.95 \leq x \leq 1$ and $0 < y \leq 0.5$, and $\delta$ indicates an oxygen deficiency amount.

When the proton conductor having such a configuration is applied to a water vapor electrolysis cell and/or a fuel cell, high proton conductivity and a high transport number of ionic conduction can be ensured, and thus high current efficiency can be exhibited.

(2) Preferably, a transport number of ionic conduction of the proton conductor in a humidified oxygen atmosphere at 600° C. is equal to or greater than 0.8.

If the transport number of ionic conduction is in such a range, when the proton conductor is applied to a water vapor electrolysis cell and/or a fuel cell, higher current efficiency can be exhibited. Here, the humidified oxygen atmosphere may be a mixed gas atmosphere of water vapor and oxygen, and may be an atmosphere having a water vapor partial pressure of 0.05 atm ($5.0 \times 10^3$ Pa) and an oxygen partial pressure of 0.95 atm ($9.5 \times 10^4$ Pa).

(3) Preferably, the formula (1) satisfies $0.98 \leq x \leq 1$.

If x is in such a range, higher proton conductivity and transport number of ionic conduction can be ensured.

(4) The element A may include Ba, the element B may include Zr, and the element M may include Y. Accordingly, the durability of the cell structure can be improved.

(5) Another embodiment of the present disclosure relates to a proton-conducting cell structure including an oxygen electrode, a hydrogen electrode, and the proton conductor interposed between the oxygen electrode and the hydrogen electrode.

When the proton-conducting cell structure having this configuration is applied to a fuel cell and/or a water vapor electrolysis cell, high current efficiency is exhibited.

(6) In the proton conductor included in the proton-conducting cell structure, a ratio $R_{Ni}$ (Ni Cation Ratio) of Ni to a total amount of the element A, the element B, and the element M is preferably equal to or less than 1.2 at %.

Accordingly, the current efficiency of a water vapor electrolysis cell and/or a fuel cell by the cell structure is improved.

(7) The hydrogen electrode may contain an element X different from any of the element A, the element B, and the element M. The element X is preferably an element that does not react with the proton conductor at a temperature of 1500° C. or higher and that reduces activity of Ni.

Accordingly, Ni can be inhibited from diffusing into the proton conductor. In addition, generation of a by-product of the proton conductor and nickel (for example, $BaY_2NiO_5$) can be prevented.

(8) The element X may be, for example, an element capable of forming a compound containing Ni.

By forming a compound containing Ni, the activity of Ni can be reduced.

(9) The element X preferably includes at least Mg.

This is because Mg has a large effect of inhibiting diffusion of Ni into the proton conductor. 90 at % or greater of the element X is more preferably Mg.

(10) The ratio $R_{Ni}$ of Ni is preferably equal to or less than 1.0 at %. Accordingly, the current efficiency of a water vapor electrolysis cell and/or a fuel cell including the cell structure is significantly improved.

(11) Another embodiment of the present disclosure relates to a water vapor electrolysis cell including the proton-conducting cell structure.

(12) Another embodiment of the present disclosure relates to a method for producing a hydrogen electrode-solid electrolyte layer complex, the method including: a step of obtaining a cell precursor in which a porous first solid electrolyte layer and a dense second solid electrolyte layer are integrated with each other; and a step of providing a nickel component (metal Ni or nickel compound) in pores of the first solid electrolyte layer, wherein each of the first solid electrolyte layer and the second solid electrolyte layer contains a metal oxide that has a perovskite structure and that is represented by formula (1): $A_xB_{1-y}M_yO_{3-\delta}$, where an element A is at least one element selected from the group consisting of Ba, Ca, and Sr, an element B is at least one element selected from the group consisting of Ce and Zr, an element M is at least one element selected from the group consisting of Y, Yb, Er, Ho, Tm, Gd, In, and Sc, $\delta$ indicates an oxygen deficiency amount, and $0.95 \leq x \leq 1$ and $0 < y \leq 0.5$ are satisfied.

With this method, diffusion of Ni into the solid electrolyte layer can be inhibited. When a hydrogen electrode-solid electrolyte layer complex obtained by this method is applied to a water vapor electrolysis cell and/or a fuel cell, high current efficiency is exhibited.

(13) A transport number of ionic conduction of the second solid electrolyte layer in a humidified oxygen atmosphere at 600° C. is preferably equal to or greater than 0.8. With the method for producing a hydrogen electrode-solid electrolyte layer complex, it is easy to make the transport number of ionic conduction of the second solid electrolyte layer equal to or greater than 0.8.

(14) In the method for producing a hydrogen electrode-solid electrolyte layer complex, the step of obtaining the cell precursor may include: a step of obtaining a paste laminate by laminating a first paste layer containing a raw material of the first solid electrolyte layer and a pore forming material and a second paste layer containing a raw material of the second solid electrolyte layer and not containing the pore forming material; and a step of firing the paste laminate at 400° C. to 1000° C.

(15) In the method for producing a hydrogen electrode-solid electrolyte layer complex, the step of providing the nickel component (metal Ni or nickel compound) in the pores may include firing at 200° C. to 600° C. after a nickel compound solution is contained in the pores.

DETAILS OF EMBODIMENTS

Hereinafter, specific examples of embodiments of the present disclosure will be described with reference to the drawings as appropriate. The present invention is not limited to these examples and is indicated by the claims, and is intended to include meaning equivalent to the claims and all modifications within the scope of the claims.

Proton Conductor

The proton conductor is a metal oxide having a perovskite structure ($ABO_3$ phase), and the composition thereof is represented by the above formula (1). An element A enters an A site, and an element B (not indicating boron) enters a B site. From the viewpoint of ensuring high proton conductivity, a part of the B site is substituted with an element M.

From the viewpoint of ensuring high proton conductivity and transport number of ionic conduction, the ratio x of the element A to the sum of the element B and the element M preferably satisfies $0.95 \leq x \leq 1$ and more preferably satisfies $0.98 \leq x \leq 1$. In addition, when x does not exceed 1, deposition of the element A is inhibited, and corrosion of the proton conductor due to action of moisture can be inhibited. From the viewpoint of ensuring proton conductivity, y preferably satisfies $0 < y \leq 0.5$ and more preferably satisfies $0.1 < y \leq 0.3$.

The element A is at least one element selected from the group consisting of Ba (barium), Ca (calcium), and Sr (strontium). Among these elements, from the viewpoint of obtaining excellent proton conductivity, the element A preferably includes Ba, and the ratio of Ba in the element A is preferably equal to or greater than 50 at % and more preferably equal to or greater than 80 at %. The element A is further preferably composed of only Ba.

The element B is at least one element selected from the group consisting of Ce (cerium) and Zr (zirconium). Among these elements, from the viewpoint of durability, the element B preferably includes Zr, and the ratio of Zr in the element B is preferably equal to or greater than 50 at % and more preferably equal to or greater than 80 at %. The element B is further preferably composed of only Zr.

The element M is at least one element selected from the group consisting of Y (yttrium), Yb (ytterbium), Er (erbium), Ho (holmium), Tm (thulium), Gd (gadolinium), In (indium), and Sc (scandium). The element M is a dopant, and causes oxygen deficiency, so that the metal oxide having a perovskite structure exhibits proton conductivity.

In the above formula (1), the oxygen deficiency amount $\delta$ can be determined in accordance with the amount of the element M, and satisfies, for example, $0 \leq \delta \leq 0.15$. The ratio of each element in the metal oxide can be obtained, for example, by using wavelength dispersive X-ray spectroscopy (hereinafter, referred to as WDX) with an electronic probe micro analyzer.

Specific examples of the metal oxide having a perovskite structure include yttrium-doped barium zirconate [$Ba_xZr_{1-y}Y_yO_{3-\delta}$ (hereinafter, referred to as BZY)], yttrium-doped barium cerate [$Ba_xCe_{1-y}Y_yO_{3-\delta}$ (BCY)], and a mixed oxide of yttrium-doped barium zirconate/barium cerate [$Ba_xZr_{1-y-z}Ce_zY_yO_{3-\delta}$ (BZCY)].

During study of a water vapor electrolysis cell in which BZY is used for a solid electrolyte and a mixture of BZY and NiO is used for a hydrogen electrode, the inventors found that the transport number of ionic conduction is decreased due to diffusion of Ni into BZY in a cell produced by a conventional co-sintering method, and the actual current efficiency is lower than the current efficiency estimated from the physical property values of BZY. Furthermore, the inventors sought for the conditions required for a proton conductor having a high transport number of ionic conduction and high current efficiency. As a result, the inventors obtained a new finding that the transport number of ionic conduction in a humidified oxygen atmosphere decreases as the deficiency amount of the element A (particularly Ba) in the compound of formula (1) increases. In a water vapor electrolysis cell, it is important to ensure the transport number of ionic conduction of a solid electrolyte layer in the humidified oxygen atmosphere.

The proton conductor according to the present disclosure can ensure a high transport number of ionic conduction even in a humidified oxygen atmosphere. The transport number of ionic conduction is the ratio of the amount of electricity carried by anions and cations to the total amount of electricity carried by electrons, holes, cations, and anions when a current flows through an electrolyte. When the total amount of electricity carried is equal to the amount of electricity carried by anions and cations, the transport number of ionic conduction is 1. For example, in the case of BZY, since protons, oxide ions, and holes exist as carriers, the transport number of ionic conduction indicates the percentage of the electricity having flowed via the protons and the oxide ions to the total electricity.

Proton-Conducting Cell Structure

Figure 1:
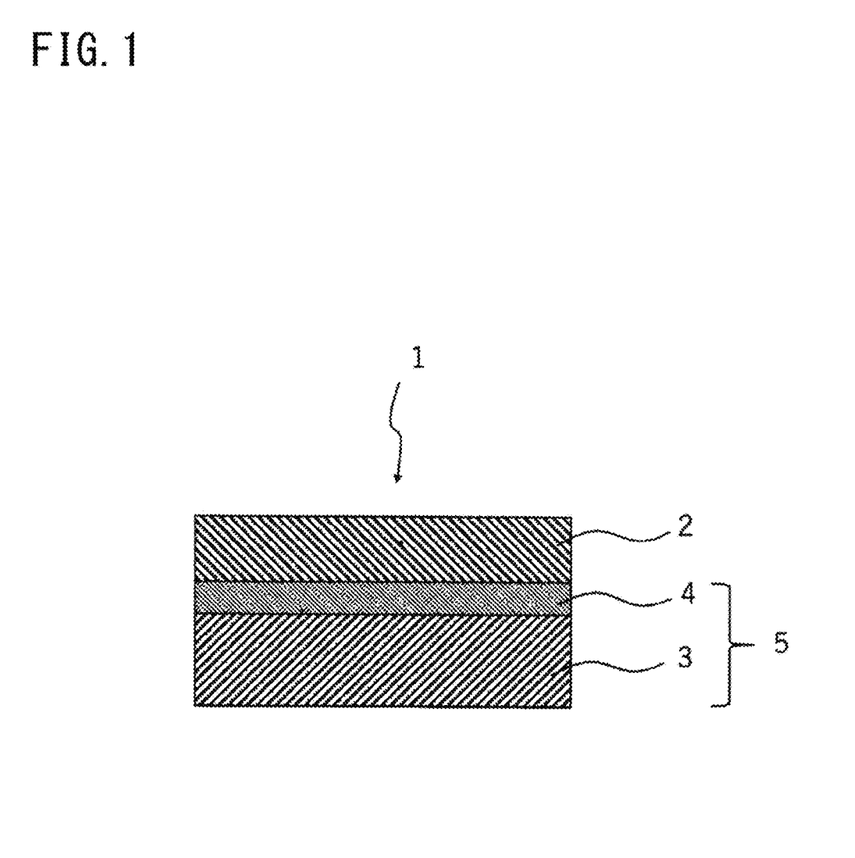
FIG. 1 is a cross-sectional view schematically showing a proton-conducting cell structure according to an embodiment of the present disclosure.

FIG. 1 shows a schematic cross-sectional view of a cell structure according to an embodiment of the present disclosure. The proton-conducting cell structure 1 includes an oxygen electrode 2, a hydrogen electrode 3, and a solid electrolyte layer (proton conductor) 4 that is interposed between the oxygen electrode 2 and the hydrogen electrode 3 and that has proton conductivity. In the proton-conducting cell structure 1, the solid electrolyte layer 4 is held between the oxygen electrode 2 and the hydrogen electrode 3, one main surface of the solid electrolyte layer 4 is in contact with the hydrogen electrode 3, and the other main surface of the solid electrolyte layer 4 is in contact with the oxygen electrode 2. The hydrogen electrode 3 and the solid electrolyte layer 4 are integrated with each other by firing to form a complex 5 of the hydrogen electrode 3 and the solid electrolyte layer 4. The thickness of the solid electrolyte layer is, for example, 1 μm to 100 μm, and preferably 3 μm to 20 μm. It is preferred if the thickness of the solid electrolyte layer is in such a range, since the resistance of the solid electrolyte layer is reduced to be low.

In the illustrated example, a laminated cell structure is shown, but the shape of the cell structure is not limited thereto. For example, the cell structure may have a cylindrical shape obtained by rolling with the hydrogen electrode 3 located inside so as to be hollow. In addition, the thickness of the hydrogen electrode 3 is larger than that of the oxygen electrode 2, and the hydrogen electrode 3 serves as a support that supports the solid electrolyte layer 4 (further the proton-conducting cell structure 1). However, the thickness of the hydrogen electrode 3 does not necessarily need to be larger than that of the oxygen electrode 2, and, for example, the thickness of the hydrogen electrode 3 and the thickness of the oxygen electrode 2 may be substantially equal to each other.

In the solid electrolyte layer 4, the ratio $R_{Ni}$ of Ni to the total amount of the element A, the element B, and the element M is preferably equal to or less than 1.2 at %, more preferably equal to or less than 0.8 at %, and further preferably equal to or less than 0.5 at %. $R_{Ni}$ is the ratio of Ni to the amount of all cations contained in the solid electrolyte layer 4 other than oxygen. By inhibiting diffusion of Ni into the solid electrolyte layer 4 as described above, a decrease in conductivity can be prevented.

$R_{Ni}$ can be obtained by evaluating an element distribution state (depth profile) using WDX. For example, when a normal line to the main surface of the solid electrolyte layer 4 is drawn through a certain point of the solid electrolyte layer 4, a region on the normal line from the boundary between the hydrogen electrode 3 and the solid electrolyte layer 4 to the boundary between the solid electrolyte layer 4 and the oxygen electrode 2 is evaluated at 1 μm intervals. Thereafter, $R_{Ni}$ may be obtained by averaging all the measurement points. However, points where it is determined not to be the proton conductor on the basis of the amounts of the element A and the element B are excluded.

Oxygen Electrode

For example, in the case of a fuel cell, the oxygen electrode 2 has a porous structure that can adsorb, dissociate, and ionize oxygen molecules. In the oxygen electrode 2, a reaction between protons conducted through the solid electrolyte layer 4 and oxide ions (reduction reaction of oxygen) occurs. The oxide ions are generated by dissociation of an oxidant (oxygen) introduced from an oxidant channel As the material of the oxygen electrode 2, for example, known materials used as the cathode of a fuel cell can be used. Among these materials, compounds that contain lanthanum and that have a perovskite structure (ferrite, manganite, and/or cobaltite, etc.) are preferable. Among these compounds, compounds containing strontium are more preferable. Specific example of such compounds include lanthanum strontium cobalt ferrite (LSCF: $La_{1-x}Sr_xFe_{1-y}Co_yO_{3-\delta}$, 0<x<1, 0<y<1), lanthanum strontium manganite (LSM: $La_{1-x}Sr_xMnO_{3-\delta}$, 0<x<1)), and lanthanum strontium cobaltite (LSC: $La_{1-x}Sr_xCoO_{3-\delta}$, 0 <x<1). Here, δ also indicates an oxygen deficiency amount.

The oxygen electrode 2 can be formed, for example, by sintering the above material. From the viewpoint of promoting the reaction between protons and oxide ions, the oxygen electrode 2 may contain a catalyst such as Pt. If the oxygen electrode 2 contains a catalyst, the oxygen electrode 2 can be formed by mixing and sintering the catalyst and the above material. If necessary, a binder, an additive, and/or a dispersion medium may be used together with the above material of the oxygen electrode 2. The thickness of the oxygen electrode 2 is not particularly limited, but may be about 5 μm to 40 μm.

Hydrogen Electrode

The hydrogen electrode 3 has a porous structure. For example, in the case of a fuel cell, in the hydrogen electrode 3, a reaction of oxidizing fuel such as hydrogen and releasing protons and electrons (oxidation reaction of fuel) is performed.

As the material of the hydrogen electrode 3, for example, materials used as the anode of a fuel cell can be used. Specific examples of such materials include a composite of nickel or a nickel compound (nickel oxide or the like) as a catalyst component and a proton conductor. The nickel compound is reduced during use of the cell to generate Ni. The compound of the above formula (1) is used for the proton conductor. Accordingly, substantial interdiffusion of the metal elements contained in the hydrogen electrode 3 and the solid electrolyte layer 4 is inhibited, and thus the resistance is unlikely to increase.

The hydrogen electrode 3 can be formed, for example, by mixing and sintering NiO powder and powder of the proton conductor. The thickness of the hydrogen electrode 3 can be determined as appropriate, for example, from 10 μm to 2 mm, and may be 10 μm to 100 μm. The hydrogen electrode 3 may be caused to serve as a support that supports the solid electrolyte layer 4, by increasing the thickness of the hydrogen electrode 3. In this case, the thickness of the hydrogen electrode 3 can be selected as appropriate, for example, from the range of 100 μm to 2 mm.

Here, for example, when a composite formed by mixing and co-sintering NiO powder and BZY powder of the proton conductor is used as the hydrogen electrode 3, Ni is likely to diffuse into BZY. When such a hydrogen electrode 3 is used in a proton-conducting cell, the conductivity and the transport number of ionic conduction of the cell are decreased. In order not to decrease the conductivity and the transport number of ionic conduction of the cell, the hydrogen electrode 3 preferably contains an element X that does not react with the BZY powder of the proton conductor at a temperature of 1500° C. or higher and that reduces the activity of Ni.

The element X may be, for example, an element capable of forming a compound containing Ni. The element X preferably includes at least Mg, 90 at % or greater of the element X is more preferably Mg, and 99 at % or greater or the whole amount of the element X is further preferably Mg. Accordingly, the ratio $R_{Ni}$ of Ni can easily be made equal to or less than 1.0 at % and further equal to or less than 0.5 at %.

Specifically, for example, a solid solution obtained by mixing MgO and NiO and heat-treating the mixture in the air can be used for the hydrogen electrode 3. The hydrogen electrode 3 may be any electrode as long as it generates Ni by reduction. When a solid solution of MgO and NiO is used, the ratio of Mg to the sum of Mg and Ni may be, for example, 30 to 70 at %, and preferably 40 to 50 at %, from the viewpoint of ensuring a desired amount of Ni.

When gas including a gas such as ammonia, methane, or propane is introduced into the hydrogen electrode 3, a decomposition reaction of these gases occurs to generate hydrogen in the hydrogen electrode 3. That is, the proton-conducting cell structure 1 has gas decomposition performance, and thus it is also possible to use the proton-conducting cell structure 1 in a gas decomposition apparatus.

For example, hydrogen generated by decomposition of ammonia is oxidized by the hydrogen electrode 3 to generate protons. The generated protons move through the solid electrolyte layer 4 to the oxygen electrode 2. On the other hand, $N_2$ generated simultaneously by decomposition of ammonia is discharged as exhaust gas. The hydrogen electrode 3 may contain a catalyst having a function of decomposing the gas. Examples of the catalyst having a function of decomposing the gas such as ammonia include a compound containing at least one catalyst component selected from the group consisting of Fe, Co, Ti, Mo, W, Mn, Ru, and Cu.

Water Vapor Electrolysis Cell

The water vapor electrolysis cell only has to include the above proton-conducting cell structure 1, and known components can be adopted as the other components. In addition, the water vapor electrolysis cell can be produced by a known method except that the above proton-conducting cell structure 1 is used.

In the case of use in a water vapor electrolysis cell, the transport number of ionic conduction in a humidified oxygen atmosphere is preferably higher, and the solid electrolyte layer 4 having a transport number of ionic conduction of at least 0.8 or greater is preferably included. Accordingly, an electronic leakage current can be inhibited in the water vapor electrolysis cell, and the efficiency of water vapor electrolysis can be improved.

The reason why the transport number of ionic conduction is preferably higher in the case where the proton conductor according to the present disclosure is applied to a water vapor electrolysis cell, will be described below.

For example, in the case of BZY, protons, oxide ions, and holes exist as carriers, and when hole conduction exists, a leakage current flows. Since the leakage current flows regardless of electrolysis, the current efficiency is decreased. Here, where the leakage current is denoted by j, the voltage of the cell is denoted by V, and the resistance to the hole conduction in the electrolyte is denoted by R, the relationship j=V/R is satisfied. When power is generated as a fuel cell, V decreases and R increases, so that j decreases. On the other hand, in the case of a water vapor electrolysis cell, V increases and R decreases, so that j increases. Therefore, in the case of a water vapor electrolysis cell, the leakage current j tends to be larger than that in the case of a fuel cell. In order to reduce the leakage current and improve the efficiency of electrolysis, it is desirable to increase the transport number of ionic conduction as much as possible.

Method for Producing Hydrogen Electrode-Solid Electrolyte Layer Complex

A method for producing a hydrogen electrode-solid electrolyte layer complex according to an embodiment of the present disclosure includes: a first step of obtaining a cell precursor in which a porous first solid electrolyte layer and a dense second solid electrolyte layer are integrated with each other; and a second step of providing a nickel component (metal Ni or nickel compound) in the pores of the first solid electrolyte layer.

Each of the first solid electrolyte layer and the second solid electrolyte layer has a perovskite structure and contains a metal oxide represented by the above formula (1). The use of such a production method makes it possible to control the nickel component (metal Ni or nickel compound) to be diffused into the second solid electrolyte layer, and thus a decrease in the conductivity of the proton-conducting cell structure due to solid dissolution of the nickel component (metal Ni or nickel compound) can be inhibited.

First Step

The first step preferably includes: a step of obtaining a paste laminate by laminating a first paste layer containing a raw material of the first solid electrolyte layer and a pore forming material (for example, carbon) and a second paste layer containing a raw material of the second solid electrolyte layer and not containing the pore forming material; and a step of firing the paste laminate to remove at least a part of the pore forming material. The firing temperature is preferably 400° C. to 1000° C. and more preferably 400° C. to 800° C. Thereafter, the fired product of the laminate is fired, for example, in an oxygen atmosphere at a high temperature of about 1500 to 1650° C. (preferably 1550 to 1650° C.) in a state of being embedded in an excess amount of BZY powder. Through the firing, a sintered body in which two layers, that is, the porous first solid electrolyte layer and the dense second solid electrolyte layer, are integrated with each other can be obtained. The pore forming material may be burnt off by pressure-molding both powder obtained by mixing a first solid electrolyte and the pore forming material and a second solid electrolyte and then heat-treating the molded body obtained by the pressure-molding.

Second Step

In the second step, the nickel component (metal Ni or nickel compound) is provided in the pores of the first solid electrolyte layer. For example, the sintered body obtained in the first step is put into an aqueous solution of nickel nitrate, and the pores of the first solid electrolyte layer of the sintered body are impregnated with the aqueous solution of nickel nitrate under reduced pressure. Thereafter, heat treatment is performed, thereby converting nickel nitrate to nickel oxide. By doing so, the nickel component (metal Ni or nickel compound) can be provided in the pores of the first solid electrolyte layer. After the pores are impregnated with the aqueous solution of nickel nitrate, the sintered body is preferably fired at a temperature of 200° C. to 600° C. and more preferably fired at a temperature of 300° C. to 500° C. At this firing temperature, nickel hardly diffuses into the second solid electrolyte layer, and a second solid electrolyte layer having a low Ni content can be obtained. The impregnation with the aqueous solution of nickel nitrate and the heat treatment are preferably repeated several times.

As a method of providing the nickel component (metal Ni or nickel compound) in the pores of the first solid electrolyte layer, metal Ni or NiO may be directly adhered to the first solid electrolyte layer by vacuum deposition or the like. Alternatively, the sintered body may be plated or electrolessly plated in a liquid in which metal Ni nanoparticles are suspended.

Hereinafter, the present disclosure will be described in more detail on the basis of Examples. The present disclosure is not limited to the Examples described below.

Example 1

(1) Production of Metal Oxides m1 to m3 ($Ba_xZr_{1-y}Y_yO_{3-\delta}$)

Barium carbonate, zirconium oxide, and yttrium oxide were put into a ball mill at a molar ratio such that the ratio x of Ba was the value shown in Table 1 and the ratio y of Y was 0.200, and were mixed for 24 hours to obtain a mixture. The obtained mixture was calcined at 1000° C. for 10 hours. The calcined mixture was treated in the ball mill for 10 hours, uniaxially molded, and then fired at 1300° C. for 10 hours in an air atmosphere. The fired sample was pulverized in a mortar and then treated in the ball mill for 10 hours. The obtained powder was uniaxially molded again, then fired at 1300° C. for 10 hours, and treated in the ball mill for 10 hours to obtain metal oxides m1 to m3.

(2) Production of Sintered Bodies and Sample Electrodes

The metal oxides m1 to m3 were uniaxially molded, and pellets thereof were obtained. Then, these pellets were embedded in a mixed powder of BZY and barium carbonate [$BZY:BaCO_3$=100:1 (mass ratio)] and sintered in an oxygen atmosphere by heat treatment at 1600° C. for 24 hours, to obtain sintered bodies S1 to S3 of the metal oxides m1 to m3 having a perovskite structure. Sample electrodes were produced by forming Pt electrodes on both surfaces of the respective sintered bodies S1 to S3 by sputtering.

TABLE 1

| Sintered body | Metal oxide | x |
|---|---|---|
| S1 | m1 | 1.000 |
| S2 | m2 | 0.980 |
| S3 | m3 | 0.950 |

(3) Measurement of Transport Number of Ionic Conduction

The sample electrodes after the Pt sputtering were each attached to a holder for measurement and placed in an electric furnace, and the temperature was increased to 700° C. The conductivity was determined by AC impedance measurement while supplying humidified oxygen such that the water vapor partial pressure was 0.05 atm (5×10³ Pa) and the oxygen partial pressure was 0.95 atm (9.5×10⁴ Pa). Solartron 1260 (manufactured by Solartron Analytical) was used for the AC impedance measurement. Thereafter, the conductivity was determined in each of a gas obtained by mixing $O_2$ into Ar at 20% [water vapor partial pressure: 0.05 atm (5×10³ Pa), oxygen partial pressure: 0.19 atm (1.9×10⁴ Pa), argon partial pressure: 0.76 atm (7.6×10⁴ Pa) a gas obtained by mixing $H_2$ into Ar at 5% [water vapor partial pressure: 0.05 atm (5×10³ Pa), hydrogen partial pressure: 0.0475 atm (4.75×10³ Pa), argon partial pressure: 0.9025 atm (9.025×10⁴ Pa) a gas obtained by mixing $H_2$ into Ar at 10% [water vapor partial pressure: 0.05 atm, hydrogen partial pressure: 0.095 atm (9.5×10³ Pa), argon partial pressure: 0.855 atm (8.55×10⁴ Pa) a gas obtained by mixing $H_2$ into Ar at 50% [water vapor partial pressure: 0.05 atm (5×10³ Pa), hydrogen partial pressure: 0.475 atm (4.75×10⁴ Pa), argon partial pressure: 0.475 atm (4.75×10⁴ Pa) and an H2 atmosphere [water vapor partial pressure 0.05 atm (5×10³Pa), hydrogen partial pressure: 0.95 atm (9.5×10⁴ Pa)].

The obtained conductivity σ is represented by $\sigma_{ion}+\sigma_{ele}$. In this case, $\sigma_{ion}$ (ion conductivity) is constant. $\sigma_{ele}$ (hole conductivity) is proportional to the ¼th power of the oxygen partial pressure $pO_2$ and thus represented by $A(pO_2)^{1/4}$.

Here, when the conductivity is measured in a certain atmosphere, only the total conductivity in the atmosphere can be obtained. That is, since the hole conductivity $\sigma_{ele}$ changes depending on the atmosphere, it is necessary to observe the change due to the atmosphere. Therefore, in order to confirm the hole conductivity in an oxygen atmosphere, the atmosphere was changed and a change in the hole conductivity was observed.

Specifically, the conductivity was fitted by using the equation of $\sigma=\sigma_{ion}+A(pO_2)^{1/4}$ to obtain $\sigma_{ion}$ and $\sigma_{ele}$. The transport number of ionic conduction is $\sigma_{ion}/(\sigma_{ion}+\sigma_{ele})$, and the transport number of ionic conduction in a humidified oxygen atmosphere was calculated using the values obtained by the fitting. In addition, measurement of the transport number of ionic conduction in the humidified oxygen atmosphere was similarly performed at 600° C. and 500° C.

Figure 2:
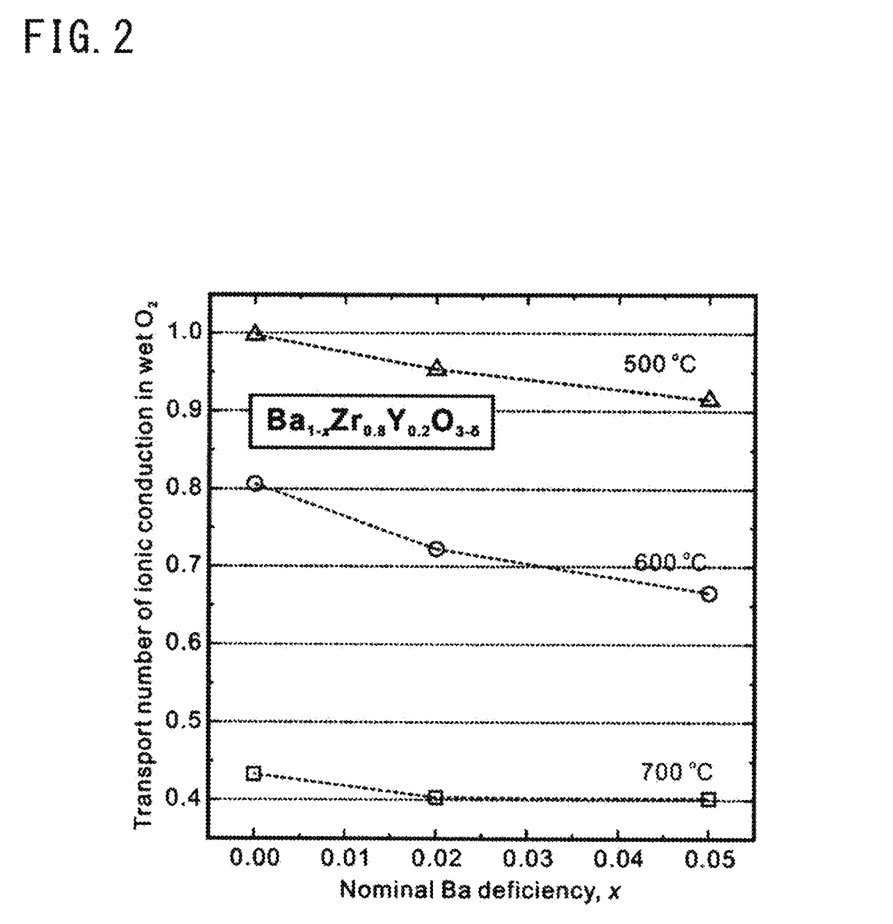
FIG. 2 is a diagram showing a relationship between a Ba deficiency amount and a transport number of ionic conduction in a proton conductor according to an embodiment of the present disclosure.

FIG. 2 shows the measurement results of the transport number of ionic conduction. It is found that, at any of the temperatures, the transport number of ionic conduction tends to decrease as the deficiency amount of Ba increases.

(4) Measurement of Ion Conductivity

For S1 to S3 after the Pt sputtering, the temperature dependence of the ion conductivity was confirmed by measuring the conductivity while changing the temperature from 600° C. to 100° C. in a humidified hydrogen atmosphere having a water vapor partial pressure of 0.05 atm (5×10³ Pa) and a hydrogen partial pressure of 0.95 atm (9.5×10⁴ Pa).

Figure 3:
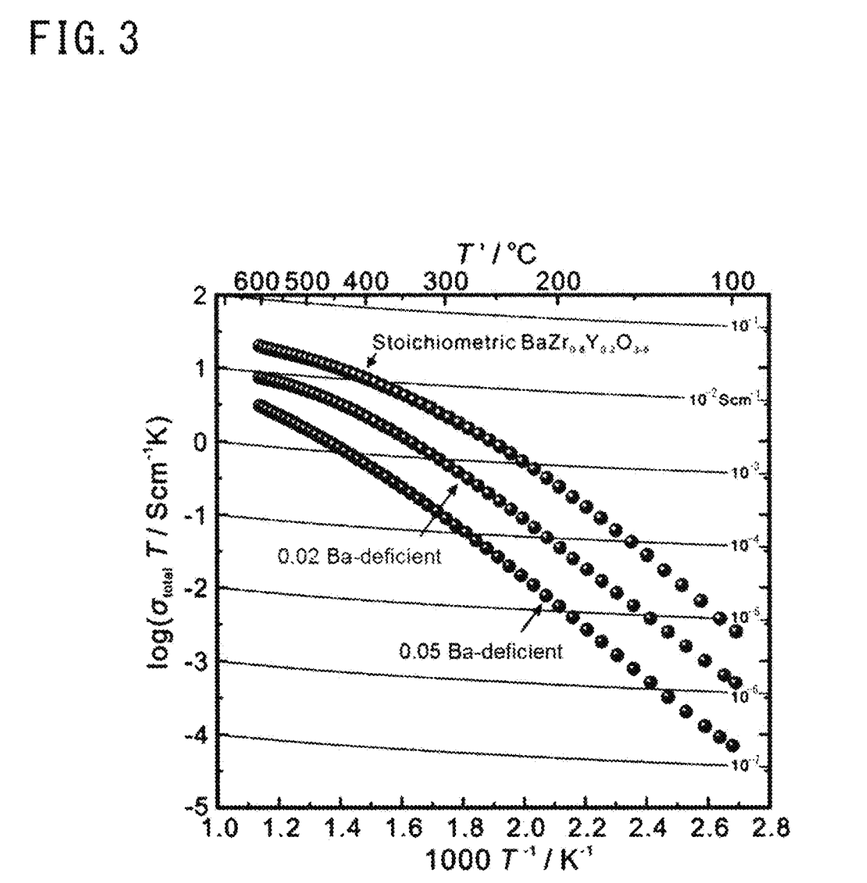
FIG. 3 is a diagram showing an Arrhenius plot for a proton conductor according to an embodiment of the present disclosure.

FIG. 3 shows the measurement results (Arrhenius plots) of the ion conductivity. The relationship between each plot shown in FIG. 3 and each sintered body is as follows.

S1: Stoichiometric composition ($BaZr_{0.8}Y_{0.2}O_{3-\delta}$)
S2: Ba deficiency amount 0.02 ($Ba_{0.98}Zr_{0.8}Y_{0.2}O_{3-\delta}$)
S3: Ba deficiency amount 0.05 ($Ba_{0.95}Zr_{0.8}Y_{0.2}O_{3-\delta}$)

The ion conductivity decreased as the temperature of the humidified hydrogen atmosphere decreased. It is found that, at any of the temperatures, the ion conductivity tends to decrease as the deficiency amount of Ba increases.

Example 2

NiO was mixed into the metal oxide m1 such that the ratio ($R_{Ni}$) of Ni to the sum of Ba, Zr, and Y in the metal oxide m1 was 2.1 at %. The obtained mixed powder was uniaxially molded, and then fired at 1500° C. for 10 hours in an oxygen atmosphere to obtain a sintered body (hereinafter, referred to as a sample BZY-Ni).

When Ni is solid-dissolved in BZY as in the sample BZY-Ni, the ion conductivity is considered to be different between a hydrogen atmosphere and an oxygen atmosphere. This is because the state of Ni in the solid solution differs between the hydrogen atmosphere and the oxygen atmosphere. For that reason, it is difficult to determine the transport number of ionic conduction by assuming the measurement result of the ion conductivity in the hydrogen atmosphere as the ion conductivity in the oxygen atmosphere as performed in Example 1. Therefore, for the sample BZY-Ni, the transport number of ionic conduction was determined by an electromotive force measurement method. For comparison, the same measurement was performed on the sample S1 containing no Ni.

The calculation of the transport number of ionic conduction by the electromotive force measurement method is as follows.

Pt is sputtered on both surfaces of the sintered body to produce an electrode (I) and an electrode (II). The water vapor partial pressure in the gas at the electrode (I) side is denoted by $P_{H2O}(I)$, the hydrogen partial pressure in the gas at the electrode (I) side is denoted by $P_{H2}(I)$, and the oxygen partial pressure in the gas at the electrode (I) side is denoted by $P_{O2}(I)$. The water vapor partial pressure in the gas at the electrode (II) side is denoted by $P_{H2O}(II)$, the hydrogen partial pressure in the gas at the electrode (II) side is denoted by $P_{H2}(II)$, and the oxygen partial pressure in the gas at the electrode (II) side is denoted by $P_{O2}(II)$.

Since protons and oxide ions can serve as charge carriers, if the gas partial pressure at each electrode is different, an electromotive force $V_{cell}$ is generated. The electromotive force $V_{cell}$ is represented by the following formula (2) or formula (3).

[Math. 1]

$$V_{cell} = (t_{H^+} + t_{O^{2-}})\frac{RT}{2F}\ln\left(\frac{p_{H_2}(I)}{p_{H_2}(II)}\right) + t_{O^{2-}}\frac{RT}{2F}\ln\left(\frac{p_{H_2O}(II)}{p_{H_2O}(I)}\right) \quad (2)$$

[Math. 2]

$$V_{cell} = (t_{H^+} + t_{O^{2-}})\frac{RT}{4F}\ln\left(\frac{p_{O_2}(II)}{p_{O_2}(I)}\right) + t_{H^+}\frac{RT}{2F}\ln\left(\frac{p_{H_2O}(I)}{p_{H_2O}(II)}\right) \quad (3)$$

Here, $t_H^+$ indicates a transport number of proton conduction, $t_O^{2-}$ indicates a transport number of oxide ion conduction, R indicates the gas constant, F indicates the Faraday constant, and T indicates the temperature (K).

Formula (2) is used in the case of measuring the transport number of ionic conduction $(t_H^+ + t_O^{2-})$ in a humidified hydrogen atmosphere. The water vapor partial pressures $P_{H2O}(I)$ and $P_{H2O}(II)$ at both electrodes were set to 0.03. The hydrogen partial pressure $P_{H2}(I)$ at one electrode side was fixed to 0.97, the hydrogen partial pressure $P_{H2}(II)$ at the other electrode side was set to 0.29, 0.39, 0.49, 0.58, 0.68, and 0.78, and an electromotive force $V_{mea}$ was measured at each of the hydrogen partial pressures. The measured electromotive forces were plotted on a graph with a horizontal axis $\log[P_{H2}(II)]$ and a vertical axis V. The transport number of ionic conduction was calculated from the slope when the plot was linearly approximated and the slope when the transport number of ionic conduction $(t_H^+ - t_O^{2-})$ was 1. At this time, the transport number of ionic conduction is affected by overvoltage of the electrode, and thus was corrected with the following formula (4). In formula (4), $V_{cell}$ is a value obtained when $(t_H^+ + t_O^{2-}) = 1$ is substituted into formula (2).

[Math. 3]

$$(t_{H^+} + t_{O^{2-}}) = 1 - \frac{R_{electrolyte}}{R_{total}}\left(1 - \frac{V_{mea}}{V_{cell}}\right) \quad (4)$$

Formula (3) is used in the case of measuring the transport number of ionic conduction in a humidified oxygen atmosphere. The water vapor partial pressures $P_{H2O}(I)$ and $P_{H2O}(II)$ at both electrodes were set to 0.03. The oxygen partial pressure $P_{O2}(II)$ at one electrode side was fixed to 0.97, the oxygen partial pressure $P_{O2}(I)$ at the other electrode side was set to 0.29, 0.39, 0.49, 0.58, 0.68, and 0.78, and an electromotive force $V_{mea}$ was measured at each of the oxygen partial pressures. The measured electromotive forces were plotted on a graph with a horizontal axis $\log[P_{O2}(I)]$ and a vertical axis V. The transport number of ionic conduction was calculated from the slope when the plot was linearly approximated, and was corrected in the same manner as described above.

Figure 4:
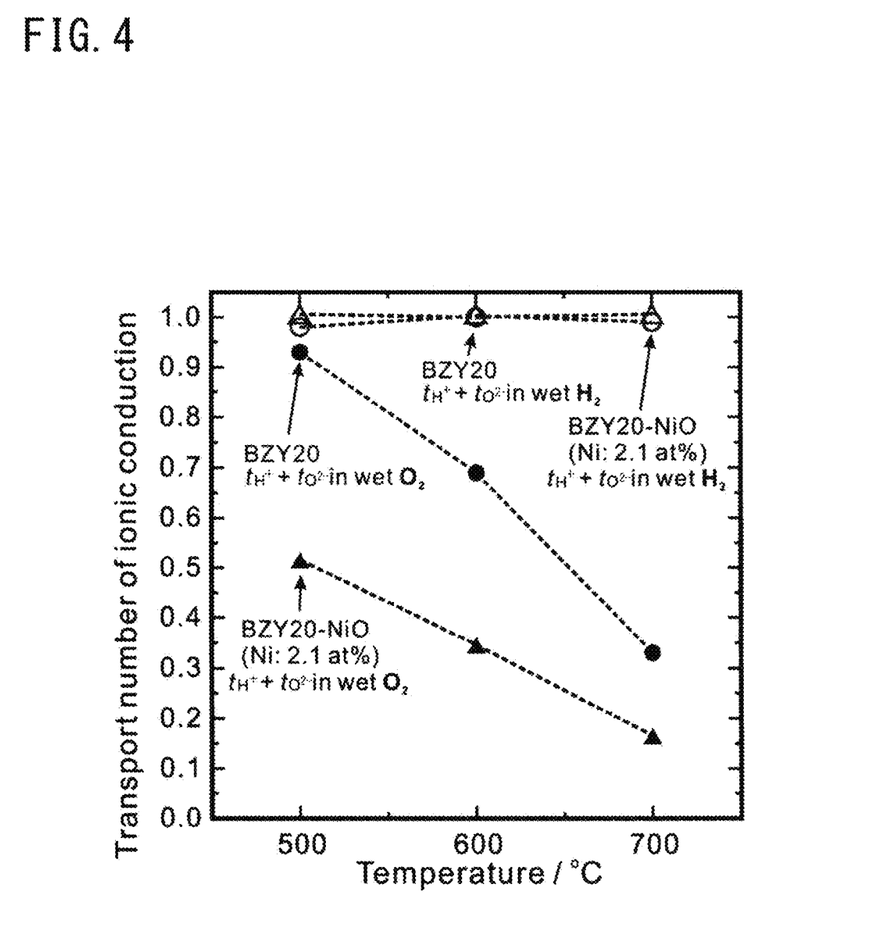
FIG. 4 is a diagram showing a relationship between an ambient temperature and a transport number of ionic conduction in a proton conductor according to an embodiment of the present disclosure.

FIG. 4 shows the measurement results of the transport number of ionic conduction. The transport number of ionic conduction in the humidified oxygen atmosphere tends to decrease as the temperature rises. This tendency is greater in the sample BZY-Ni (mark ▲ in FIG. 4), which is a solid solution containing Ni, as compared to that in the sample S1 containing no Ni (mark ● in FIG. 4). For that reason, the transport number of ionic conduction of the sample BZY-Ni is lower than the transport number of ionic conduction of the sample S1. Therefore, in the case of applying the sample BZY-Ni to a water vapor electrolysis cell in a medium temperature range, it is desirable to reduce the amount of Ni contained in BZY as much as possible. FIG. 4 also shows the results of measurement of the transport number of ionic conduction in the humidified hydrogen atmosphere. The mark ○ in FIG. 4 is the result of the sample Si containing no Ni, and the mark △ in FIG. 4 is the result of the sample BZY-Ni, which is a solid solution containing Ni. It is found that, in the humidified hydrogen atmosphere, the transport number of ionic conduction hardly changes.

Example 3

The metal oxide ml and NiO were mixed such that the ratio $(R_{Ni})$ of Ni to the sum of Ba, Zr, and Y in the metal oxide ml was 0.4 at %, 0.6 at %, and 1.3 at %. Each obtained mixed powder was uniaxially molded, and then heat-treated at 1500° C. for 10 hours in an oxygen atmosphere, thereby obtaining a sintered body. Pt electrodes were formed on both surfaces of the sintered body by sputtering, thereby obtaining a sample electrode.

Figure 5:
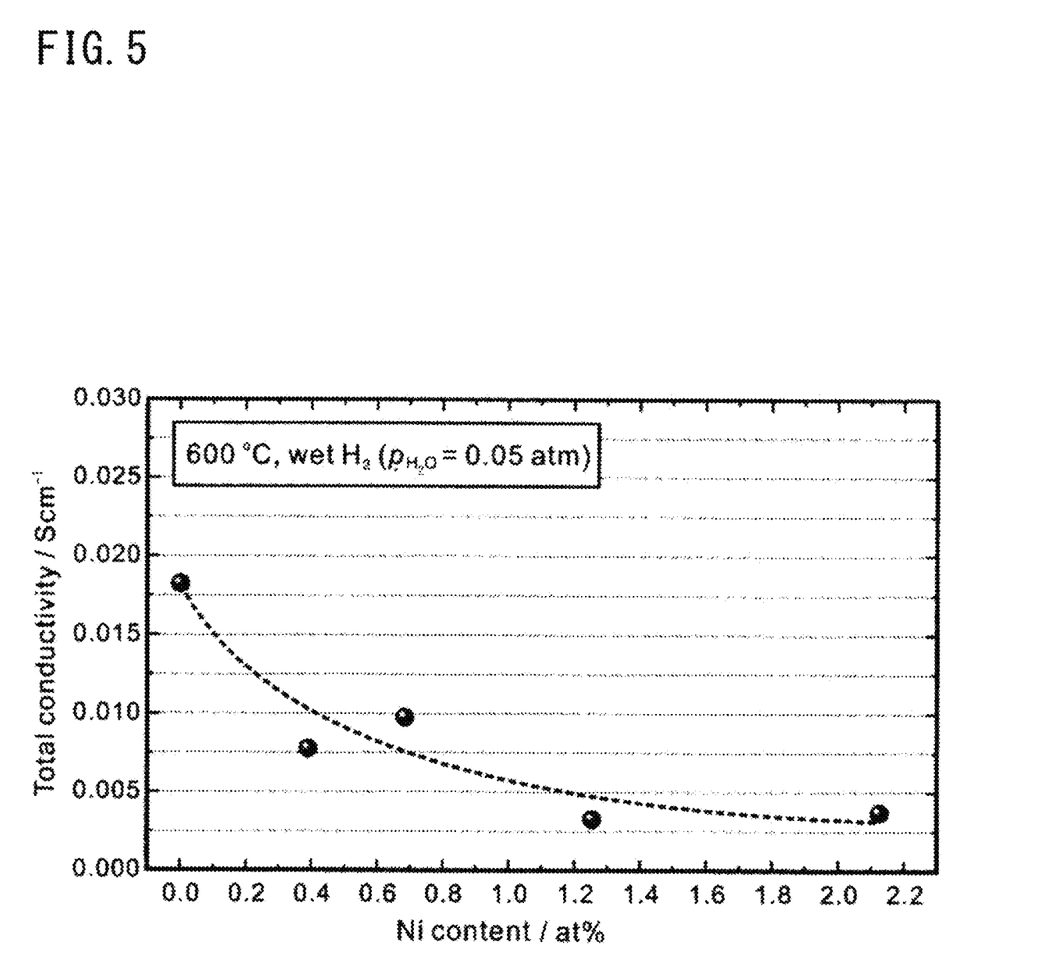
FIG. 5 is a diagram showing a relationship between a ratio ($R_{Ni}$) of Ni contained in a proton conductor according to an embodiment of the present disclosure and total conductivity at 600° C. in a hydrogen atmosphere.

The sample electrode after the Pt sputtering was attached to a holder for measurement and placed in an electric furnace, and the temperature was increased. At 600° C., the conductivity was determined by AC impedance measurement while supplying humidified hydrogen such that the water vapor partial pressure was 0.05 atm ($5 \times 10^3$ Pa) and the hydrogen partial pressure was 0.95 atm ($9.5 \times 10^4$ Pa). FIG. 5 shows the obtained total conductivity in the hydrogen atmosphere. For the sintered body Si produced in Example 1 and the sample BZY-Ni produced in Example 2, the total conductivity in the hydrogen atmosphere was determined after the sample electrode was produced, and the results are also shown in FIG. 5.

From FIG. 5, it is found that the total conductivity decreases as $R_{Ni}$ increases. In the case of applying a proton-conducting cell structure to a water vapor electrolysis cell, it is required that the resistance of the solid electrolyte layer be reduced and the total conductivity be at least 0.005 S/cm or greater.

Here, in a water vapor electrolysis cell having a proton-conducting cell structure, a trial calculation of the water vapor electrolysis efficiency from the total conductivity is as follows.

First, the electrolysis efficiency is assumed to be current efficiency (net current used for electrolysis/total current including leakage current). Here, as parameters that affect the electrolysis efficiency, there are many parameters (electrolyte thickness, electrode gas composition, electrode catalyst performance, current density, etc.) other than the electrolyte conductivity, and a decrease in ion conductivity assuredly leads to a decrease in electrolysis efficiency.

Specifically, for example, when a trial calculation is made with the following parameters with which a potential in a water vapor electrolysis cell having BZY as an electrolyte is close to the ideal potential, the electrolysis efficiency when electrolysis is performed at a current density of 0.3 A/cm² decreases from 90.9% at an electrolyte conductivity of 0.018 S/cm (Ni-free) to 87.5% at an electrolyte conductivity of 0.005 S/cm.

Trial Calculation Parameters

Electrolyte thickness: 20 μm
Hydrogen electrode: water vapor partial pressure 0.05 atm ($5 \times 10^3$ Pa), hydrogen partial pressure 0.95 atm ($9.5 \times 10^4$ Pa)
Oxygen electrode: oxygen partial pressure 0.01 atm ($1 \times 10^3$ Pa), water vapor partial pressure 0.99 atm ($9.9 \times 10^4$ Pa) (assuming humidified water vapor supply)
Hole conductivity: 0.0044 S/cm in a humidified oxygen atmosphere (water vapor partial pressure 0.05 atm ($5 \times 10^3$ Pa), oxygen partial pressure 0.95 atm ($9.5 \times 10^4$ Pa)) Electrode reaction resistance: 0.1 Ωcm² (the actual value is 0.15 Ωcm² for the hydrogen electrode and 0.5 Ωcm² for the oxygen electrode)

Therefore, it is inferred that, in a water vapor electrolysis cell having a proton-conducting cell structure, by setting the total conductivity to 0.005 S/cm or greater, satisfactory efficiency of water vapor electrolysis (specifically, a water vapor electrolysis efficiency of 85% or greater) can be obtained. According to the results in FIG. 5, it is found that the total conductivity tends to increase as $R_{Ni}$ decreases, and the total conductivity is equal to or greater than 0.005 S/cm when $R_{Ni}$ is equal to or less than 1.2 at %.

Example 4

(1) Preparation of Solid Solution of MgO and NiO

Magnesium oxide and nickel oxide were put into a ball mill at a molar ratio of 1:1 and mixed for 24 hours to obtain a mixture. The obtained mixture was treated in the ball mill for 10 hours, uniaxially molded, and then fired at 1300° C. for 10 hours in an air atmosphere. The fired sample was pulverized in a mortar, and then treated in the ball mill for 10 hours, thereby obtaining a solid solution of MgO and NiO (hereinafter, referred to as an NiO/MgO solid solution). For the NiO/MgO solid solution, only a single-phase cubic crystal (space group: Fm-3m) XRD pattern was detected by X-ray diffraction (XRD) measurement, and it was confirmed that the NiO/MgO solid solution was a single-phase of an MgO/NiO solid solution. For the XRD measurement, X'pert Pro manufactured by Malvern Panalytical Ltd. was used, X-rays were CuKα rays (tube voltage: 45 kV, tube current: 40 mA), a focusing method was used, the 2θ scanning range was 5-90 degrees, 0.017 degrees/step was set, and 10.16 sec/step was set.

(2) Preparation of Hydrogen Electrode Powder

The NiO/MgO solid solution and the metal oxide m1 were used as materials for a hydrogen electrode. A hydrogen electrode powder was prepared by mixing the NiO/MgO solid solution, the metal oxide m1, and an appropriate amount of 2-propanol in a ball mill and then drying the mixture. The NiO/MgO solid solution and the metal oxide m1 were mixed at a weight ratio of 1:1. In addition, the amounts of a binder and an additive were 10 parts by mass and 0.5 parts by mass, respectively, per 100 parts by mass of the NiO/MgO solid solution and the metal oxide m1 in total.

(3) Preparation of Solid Electrolyte Paste

The above metal oxide m1 was used as a material for a solid electrolyte layer. The metal oxide m1, ethyl cellulose (binder), and an appropriate amount of α-terpineol were mixed to prepare a solid electrolyte paste. The amount of the binder was 4 parts by mass per 100 parts by mass of the metal oxide m1.

(4) Production of Hydrogen Electrode-Solid Electrolyte Layer Complex A

The above hydrogen electrode powder was uniaxially molded under a pressure of 392 MPa to obtain disk-shaped pellets (diameter: 11 mm), and then the disk-shaped pellets were heat-treated at 1000° C. in the air for 10 hours. The above solid electrolyte paste was applied to one main surface of each of the obtained disc-shaped pellets by spin coating to form a coating film. Binder removal treatment was performed by heating the pellets having the coating film formed thereon at 600° C. for 1 hour. Next, the obtained pellets were subjected to main firing at 1600° C. for 10 hours in an oxygen atmosphere to obtain a hydrogen electrode-solid electrolyte layer complex A. When observed with a scanning electron microscope (SEM), the thickness of the hydrogen electrode was about 1.4 mm, and the thickness of the solid electrolyte layer was 20 μm.

(5) Production of Hydrogen Electrode-Solid Electrolyte Layer Complex B

For comparison, a hydrogen electrode-solid electrolyte layer complex B was produced in the same manner as the hydrogen electrode-solid electrolyte layer complex A, except that a hydrogen electrode paste was prepared using only nickel oxide without using magnesium oxide.

Next, $R_{Ni}$ in the solid electrolyte layer of the hydrogen electrode-solid electrolyte layer complex A and $R_{Ni}$ in the solid electrolyte of the hydrogen electrode-solid electrolyte layer complex B were measured. First, each of the hydrogen electrode-solid electrolyte layer complexes A and B was embedded in an epoxy resin, and then a cross-section thereof was formed by polishing and subsequently processed using IB-19510CP manufactured by JEOL Ltd. This cross-section was subjected to carbon coating using CADE-E manufactured by Meiwafosis Co., Ltd., and then set on JXA-8530F manufactured by JEOL Ltd., and WDX was performed. In the WDX, measurement was performed at 14 points at 1 μm intervals in the thickness direction from the surface of the solid electrolyte layer. At this time, the acceleration voltage was 15 kV, and the irradiation current was 50 nA. Then, $R_{Ni}$ was determined by averaging all the measurement points. However, points where a difference of 1 at % or greater from the value at the adjacent measurement point occurred were excluded.

Figure 6:
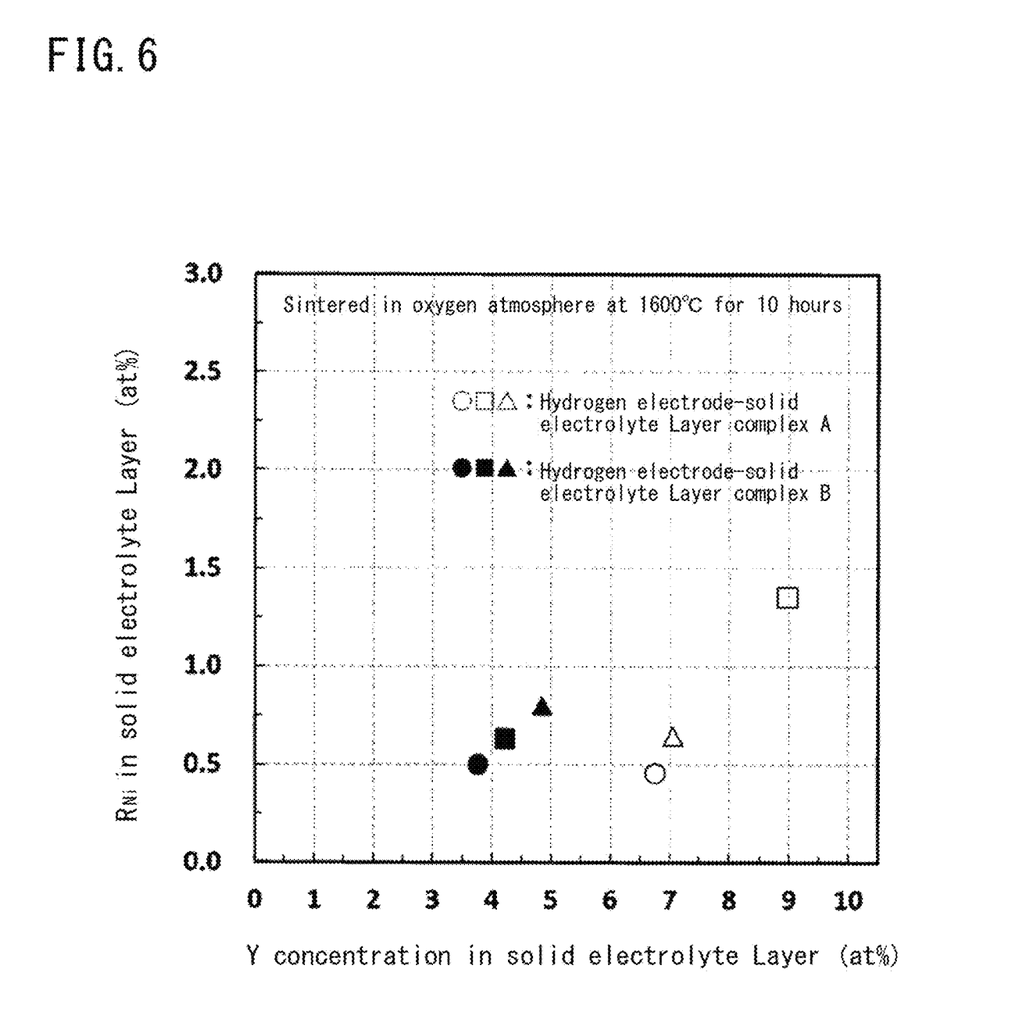
FIG. 6 is a diagram showing a relationship between $R_{Ni}$ and a Y concentration in a solid electrolyte layer of a hydrogen electrode-solid electrolyte layer complex according to an embodiment of the present disclosure.

FIG. 6 shows the relationship between a Y concentration and $R_{Ni}$ in each of the solid electrolyte layers of the hydrogen electrode-solid electrolyte layer complexes A and B. Here, the Y concentration is the ratio (at %) of Y to the total amount of the element A, the element B, and the element M in BZY. The hydrogen electrode-solid electrolyte layer complexes A and B were each prepared under the following three different preparation conditions in order to obtain BZY20 ($BaZr_{0.8}Y_{0.2}O_{3-\delta}$) having a stoichiometric composition. The relationship between each plot shown in FIG. 6 and the preparation conditions is as follows.

Mark □ and mark ■: The hydrogen electrode powder was uniaxially molded under a pressure of 392 MPa to obtain disk-shaped pellets (diameter: 11 mm), and then the disk-shaped pellets were heat-treated at 1000° C. in the air for 10 hours. The above solid electrolyte paste was applied to one main surface of each of the obtained disc-shaped pellets by spin coating to form a coating film. Binder removal treatment was performed by heating the pellets having the coating film formed thereon at 600° C. for about 1 hour. The pellets were embedded in a mixed powder of BZY and barium carbonate [$BZY:BaCO_3$=100:1 (mass ratio)], and heat-treated at 1600° C. for 10 hours in an oxygen atmosphere.

Mark Δ and mark ▲: Heat treatment is performed in the same manner as in the case of the mark □, except that the pellets after the binder removal treatment are placed on a mixed powder of BZY and barium carbonate [$BZY:BaCO_3$=100:1 (mass ratio)].

Mark ○ and mark ●: Heat treatment is performed in the same manner as in the case of the mark □, except that the pellets after the binder removal treatment are exposed as they are.

In FIG. 6, when the Y concentration is 10 at %, it is considered that BZY20 ($BaZr_{0.8}Y_{0.2}O_{3-\delta}$) having a stoichiometric composition is prepared.

From FIG. 6, it is found that as the Y concentration in the solid electrolyte layer increases, a by-product containing Y and Ni (for example, $BaY_2NiO_5$) is more likely to be generated, and thus $R_{Ni}$ tends to increase. However, when the hydrogen electrode-solid electrolyte layer complex A and the hydrogen electrode-solid electrolyte layer complex B are compared to each other, the Y concentration in the complex A is almost twice that in the complex B if $R_{Ni}$ is the same. This result indicates that diffusion of Ni is less likely to proceed in the solid electrolyte layer of the complex A than in the solid electrolyte layer of the complex B.

REFERENCE SIGNS LIST 1 cell structure
2 oxygen electrode
3 hydrogen electrode
4 solid electrolyte layer
5 electrolyte layer-electrode complex

The invention claimed is:

1. A proton-conducting cell structure comprising:
an oxygen electrode;
a hydrogen electrode; and
a proton conductor interposed between the oxygen electrode and the hydrogen electrode, wherein
the proton conductor containing a metal oxide that has a perovskite structure and that is represented by the following formula (1):

$$A_x B_{1-y} M_y O_{3-\delta} \quad (1),$$

where
an element A is at least one element selected from the group consisting of Ba, Ca, and Sr,
an element B is at least one element selected from the group consisting of Ce and Zr,
an element M is at least one element selected from the group consisting of Y, Yb, Er, Ho, Tm, Gd, In, and Sc,
$\delta$ indicates an oxygen deficiency amount,
$0.95 \leq x \leq 1$ and $0 < y \leq 0.5$ are satisfied,
the hydrogen electrode contains nickel and an element X different from any of the element A, the element B, and the element M, wherein the element X includes at least Mg; and
a ratio $R_{Ni}$ of Ni contained in the proton conductor to a total amount of the element A, the element B, and the element M contained in the proton conductor is equal to or less than 1.2 at %.

2. The proton conductor according to claim 1, wherein a transport number of ionic conduction of the proton conductor in a humidified oxygen atmosphere at 600° C. is equal to or greater than 0.8.

3. The proton conductor according to claim 1, wherein the formula (1) satisfies $0.98 \leq x \leq 1$.

4. The proton conductor according to claim 1, wherein
the element A includes Ba,
the element B includes Zr, and
the element M includes Y.

5. The proton-conducting cell structure according to claim 1, wherein the ratio $R_{Ni}$ of Ni is equal to or less than 1.0 at %.

6. A water vapor electrolysis cell comprising the proton-conducting cell structure according to claim 1.

* * * * *